TRAGESER & ILLOFSKY.
Apparatus for Distilling.
No. 68,470.
2 Sheets—Sheet 1.
Patented Sept. 3, 1867.
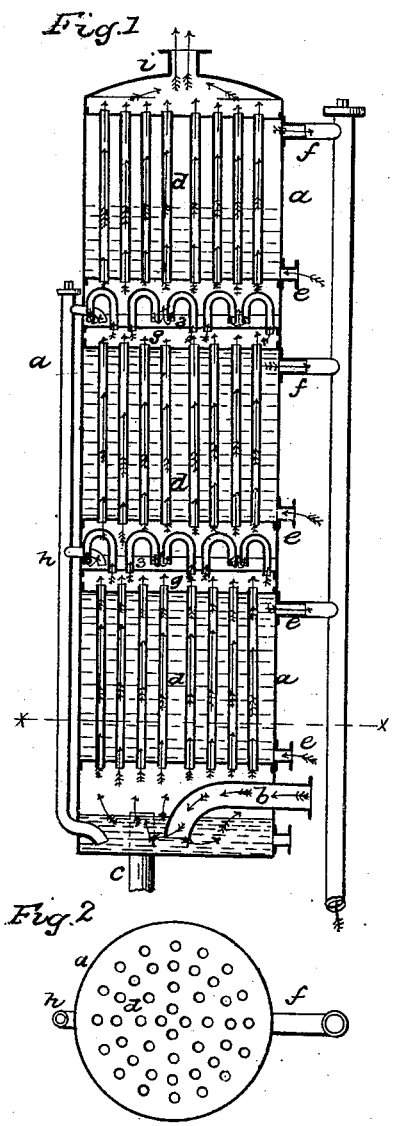

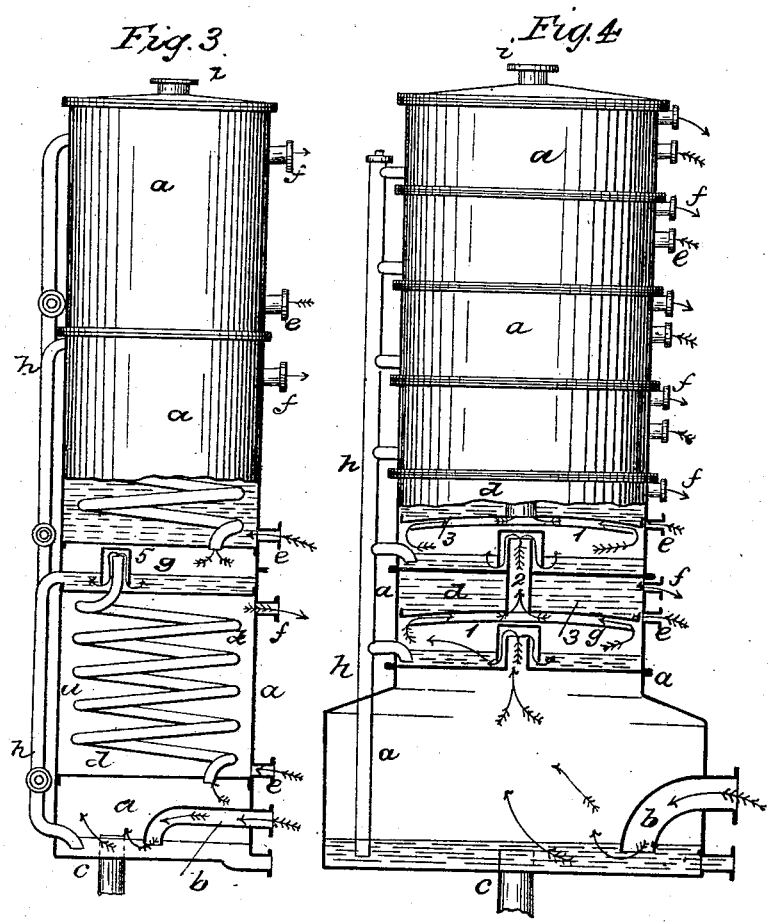

United States Patent Office.

JOHN TRAGESER AND IGNATZ ILLOFSKY, OF NEW YORK, N. Y.

*Letters Patent No. 68,470, dated September 3, 1867.*

---

IMPROVEMENT IN APPARATUS FOR DISTILLING.

---

*The Schedule referred to in these Letters Patent and making part of the same.*

---

TO ALL WHOM IT MAY CONCERN:

Be it known that we, JOHN TRAGESER and IGNATZ ILLOFSKY, of the city and State of New York, have invented and made a certain new and useful Improvement in Boiling and Condensing Apparatus for High Wines, Alcohol, &c.; and we do hereby declare the following to be a full, clear, and exact description of the said invention, reference being had to the annexed drawing, making part of this specification, in which—

Figure 1 is a vertical section of the said apparatus.

Figure 2 is a sectional plan at the line $x\ x$.

Figures 3 and 4 are elevations, partially in section, of modifications of this apparatus.

Similar marks of reference denote the same parts.

The object of this invention is to submit the products of distillation to successive condensing and boiling operations, at gradually diminishing temperatures, so that the alcohol or high wines can be brought to any desired strength by passing through the apparatus.

The nature of our said invention consists in a series of alternate condensers and boilers, so arranged that the watery portions pass back to the still, while the spirit or more easily evaporated portions go off to a condenser or refrigerator.

This apparatus is to be distinguished from the ordinary rectifying column, in which the temperature is gradually lessened, but there is no supply of water to condensers alternated with the boiling apparatus, hence the temperature cannot be regulated with as much accuracy as in our device, because the supply of water can be varied as required by the condition of the atmosphere.

In the drawing, $a$ is a vertical cylinder or case. $b$ is a pipe through which the vapors from the "doubler" or still are introduced, as indicated by red arrows. $c$ is an overflow pipe, that returns the watery portions and low wines to the still. $d$ is a condenser introduced in the case $a$, and supplied with water by the pipe $e$, and provided with an overflow at $f$. The condenser is made so as to expose the necessary extent of surface for acting upon the vapors. In fig. 1, the condenser is made of a series of vertical pipes, between the heads that are set into the case $a$. In fig. 3, the condensing surface is represented as a coiled pipe; and in fig. 4, the condensing surface is the under side of the water-space $d$, an arched disk, 1, being employed to direct the vapors into contact with said condenser in their passage from the outer portion of the still to the ascending pipe 2. The temperature of the condenser $d$ is to be regulated, so that the watery portions will be condensed and run back, while the wines and spirit vapors pass on to the second boiling apparatus $g$. These vapors heat the liquid above the diaphragm 3, causing the evaporation of the wines or spirits from the watery portions, and these watery portions, by their accumulation, overflow down the pipe $h$, and return to the still. The vapors that ascend are brought into contact with the liquid above the diaphragm 3, by the tubes being bent over, as seen in fig. 1, or formed with caps, as in figs. 3 and 4. These parts are duplicated to any desired extent, a condensing apparatus alternating with a boiling or vaporizing apparatus, and the temperatures of the condensers are to be less and less in the successive condensers, so that a pure or nearly pure spirit will be condensed from the vapors passing away by the pipe $i$. We prefer to place the condensing and boiling apparatus one over the other, as represented, but they may be placed side by side, if desired.

What we claim, and desire to secure by Letters Patent, is—

A series of condensing and boiling apparatus, arranged alternately, and fitted in substantially the manner specified, and for the purposes set forth.

Dated May 27, 1867.

JOHN TRAGESER,
IG. ILLOFSKY.

Witnesses:
CHAS. H. SMITH,
GEO. D. WALKER.